(12) United States Patent  (10) Patent No.: US 7,653,574 B2
Harper et al.  (45) Date of Patent: Jan. 26, 2010

(54) SYSTEMS AND METHODS FOR THE SELECTION AND PURCHASE OF DIGITAL ASSETS

(75) Inventors: Gregory W. Harper, New York, NY (US); John J. Sullivan, Delmar, NY (US)

(73) Assignee: Trans World Entertainment Corporation, Albany, NY (US)

( * ) Notice: Subject to any disclaimer, the term of this patent is extended or adjusted under 35 U.S.C. 154(b) by 749 days.

(21) Appl. No.: 11/025,149

(22) Filed: Dec. 30, 2004

(65) Prior Publication Data

US 2005/0144091 A1 Jun. 30, 2005

Related U.S. Application Data

(60) Provisional application No. 60/533,052, filed on Dec. 30, 2003, provisional application No. 60/602,642, filed on Aug. 19, 2004.

(51) Int. Cl.
G06F 17/60 (2006.01)
(52) U.S. Cl. ...................................... 705/26
(58) Field of Classification Search ................ 455/406; 340/572; 194/213; 235/383; 705/1–60; 345/184; 380/240
See application file for complete search history.

(56) References Cited

U.S. PATENT DOCUMENTS

| 5,636,276 | A | 6/1997 | Brugger |
| 5,872,588 | A | 2/1999 | Aras et al. |
| 5,918,213 | A * | 6/1999 | Bernard et al. ............... 705/26 |
| 6,170,014 | B1 | 1/2001 | Darago et al. |
| 6,219,652 | B1 | 4/2001 | Carter et al. |
| 6,343,280 | B2 | 1/2002 | Clark |
| 6,366,914 | B1 | 4/2002 | Stern |
| 6,378,684 | B1 * | 4/2002 | Cox ......................... 194/213 |
| 6,385,596 | B1 | 5/2002 | Wiser et al. |
| 6,553,404 | B2 | 4/2003 | Stern |
| 6,591,247 | B2 | 7/2003 | Stern |
| 6,611,812 | B2 | 8/2003 | Hurtado et al. |
| 6,647,417 | B1 | 11/2003 | Hunter et al. |
| 6,665,489 | B2 | 12/2003 | Collart |
| 6,671,818 | B1 | 12/2003 | Mikurak |
| 2001/0002468 | A1 * | 5/2001 | Nel ........................... 705/26 |
| 2001/0029605 | A1 | 10/2001 | Forbes et al. |

(Continued)

FOREIGN PATENT DOCUMENTS

WO WO 01/20844 A1 3/2001

(Continued)

OTHER PUBLICATIONS

Method and Systems for providing guaranteed merchant transactions, First Data Corporation, Apr. 28, 2004.*

(Continued)

Primary Examiner—James P Trammell
Assistant Examiner—Tien C Nguyen
(74) Attorney, Agent, or Firm—Rothwell, Figg, Ernst & Manbeck, P.C.

(57) ABSTRACT

The present invention provides systems and methods for enabling a customer to sample content and select content for purchasing while the customer is in a retail store. Advantageously, the customer may be given one or more options for the delivery of the content.

35 Claims, 12 Drawing Sheets

U.S. PATENT DOCUMENTS

| | | | |
|---|---|---|---|
| 2001/0042016 A1 | 11/2001 | Muyres et al. | |
| 2001/0044747 A1 | 11/2001 | Ramachandran et al. | |
| 2002/0004744 A1 | 1/2002 | Muyres et al. | |
| 2002/0022966 A1* | 2/2002 | Horgan | 705/1 |
| 2002/0111912 A1* | 8/2002 | Hunter et al. | 705/52 |
| 2002/0165811 A1* | 11/2002 | Ishii et al. | 705/36 |
| 2002/0194087 A1* | 12/2002 | Spiegel et al. | 705/26 |
| 2003/0018579 A1* | 1/2003 | Litster et al. | 705/40 |
| 2003/0020696 A1* | 1/2003 | Horsley | 345/184 |
| 2003/0222135 A1* | 12/2003 | Stoutenburg et al. | 235/379 |
| 2004/0044564 A1* | 3/2004 | Dietz et al. | 705/10 |
| 2004/0086120 A1* | 5/2004 | Akins et al. | 380/240 |
| 2004/0127256 A1* | 7/2004 | Goldthwaite et al. | 455/558 |

FOREIGN PATENT DOCUMENTS

| | | |
|---|---|---|
| WO | WO 01/45058 A1 | 6/2001 |
| WO | WO 02/09044 A2 | 1/2002 |

OTHER PUBLICATIONS

Method of and syterm for enabling brand-image communication between vendors and consumes, IPF, Inc. Nov. 17, 1999.*
International Search Report and Written Opinion issued in PCT/US/07/15782 on Feb. 8, 2008, 11 pp.
Supplementary European Search Report issued in EP 04815813 on Apr. 28, 2009, 3 pages.

* cited by examiner

SYSTEMS AND METHODS FOR THE SELECTION AND PURCHASE OF DIGITAL ASSETS

CROSS-REFERENCE TO RELATED APPLICATIONS

This application claims the benefit of U.S. Provisional Patent Application No. 60/533,052, filed Dec. 30, 2003, and also claims the benefit of U.S. Provisional Patent Application No. 60/602,642, filed Aug. 19, 2004. The contents of the above mentioned provisional applications are incorporated herein by this reference.

This application is related to U.S. patent application Ser. No. 10/258,848, filed Mar. 7, 2003, the content of which is incorporated herein by this reference.

BACKGROUND OF THE INVENTION

1. Field of the Invention

The invention relates to systems and methods for the selection and downloading of digital assets, such as digital audio and/or video content.

2. Discussion of the Background

U.S. patent application Ser. No. 10/258,848 (the '848 application) describes systems and methods for enabling customer's to listen to and/or view content, such as audio tracks from a compact disk (CD) or movie trailers. For example, the '848 application discloses placing throughout a retail store a number of computer systems, each of which includes audio and/or video output devices and are networked with a server that stores digital assets available for sampling. The customer interacts with a computer system to locate and sample assets. That is, the customer can instruct the computer system to retrieve content from the server and play the content so that the customer can listen to and/or view the content.

SUMMARY OF THE INVENTION

The present invention provides systems and methods for enabling a customer to sample assets and select assets for purchasing while the customer is in a retail store. Advantageously, the customer may be given one or more options for the delivery of the assets. For example, the customer may be given the option to have the purchased asset be available for downloading to a home computer through the Internet or other network. Additionally, the customer may be given the option of specifying an encoding format for the asset. For example, if the customer purchased music, the customer may be given the option of selecting an audio encoding format or DRM format (e.g., MP3, AAC, WMA, etc.).

In one particular embodiment, the present invention provides a method for enabling a customer in a retail store to purchase digital assets. The method, according to one embodiment, includes: receiving at a terminal located within the retail store a virtual shopping cart identifier inputted by the customer; displaying to the customer at the terminal a user interface that enables the customer to select a digital asset for purchase; receiving at the terminal an input from the customer indicating that the customer desires to add the digital asset to the customer's virtual cart; transmitting from the terminal to the server system an asset identifier identifying the digital asset, wherein the server system associates the asset identifier with the cart identifier; receiving at the terminal and from the customer an indication that the customer is ready to purchase the contents of the customer's virtual cart; transmitting to a fulfillment system an order message; receiving from the fulfillment system an order response that includes an order confirmation code; providing the order confirmation code to the customer; and downloading from the fulfillment system to a customer device located outside of the store the one or more digital assets.

The downloading step includes: inputting the confirmation code into the customer device and transmitting the confirmation code from the customer device to the fulfillment system. The fulfillment system uses the received confirmation code to determine digital assets that were purchased by the customer and then transmits those digital assets to the customer's device.

According to another embodiment, the method includes: receiving at a terminal located within the retail store an account identifier associated with the customer; displaying to the customer at the terminal a user interface that enables the customer to select a digital asset for purchase; receiving at the terminal input from the customer indicating that the customer desires to purchase the digital asset; transmitting from the terminal to the server system an asset identifier identifying the digital asset, wherein the server system uses a database to associate the asset identifier with the account identifier; receiving an indication that the customer is ready to purchase the digital assets identified by the asset identifiers associated with the account identifier; transmitting to a fulfillment system an order message, wherein the order message includes the account identifier and information identifying one or more digital assets; and downloading from the fulfillment system to a customer device located outside of the store the one or more digital assets, wherein the downloading step includes transmitting the account code from the customer device to the fulfillment system so that the fulfillment system can determine the digital assets that are associated with the account identifier and then transmit those assets to the customer's device.

According to still another embodiment, the method includes: providing the customer with a shopping card having a virtual shopping cart identifier printed thereon or stored therein; placing a terminal in the retail store, the terminal having a reader for reading virtual shopping cart identifiers printed on or stored in shopping cards; displaying to the customer at the terminal a user interface that enables the customer to select a digital asset for purchase; receiving at the terminal input from the customer indicating that the customer desires to purchase the digital asset; transmitting from the terminal to the server system an asset identifier identifying the digital asset; receiving an indication that the customer is ready to purchase the digital assets identified by the asset identifiers associated with the cart identifier; transmitting to a fulfillment system an order message; receiving an order response from the fulfillment system, wherein the order response includes an order confirmation code; providing the order confirmation code to the customer; and downloading from the fulfillment system to a customer device located outside of the store the one or more digital assets.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use embodiments of the invention. In the drawings, like reference numbers indicate identical or functionally similar elements.

DETAILED DESCRIPTION OF PREFERRED EMBODIMENTS

Figure 1:
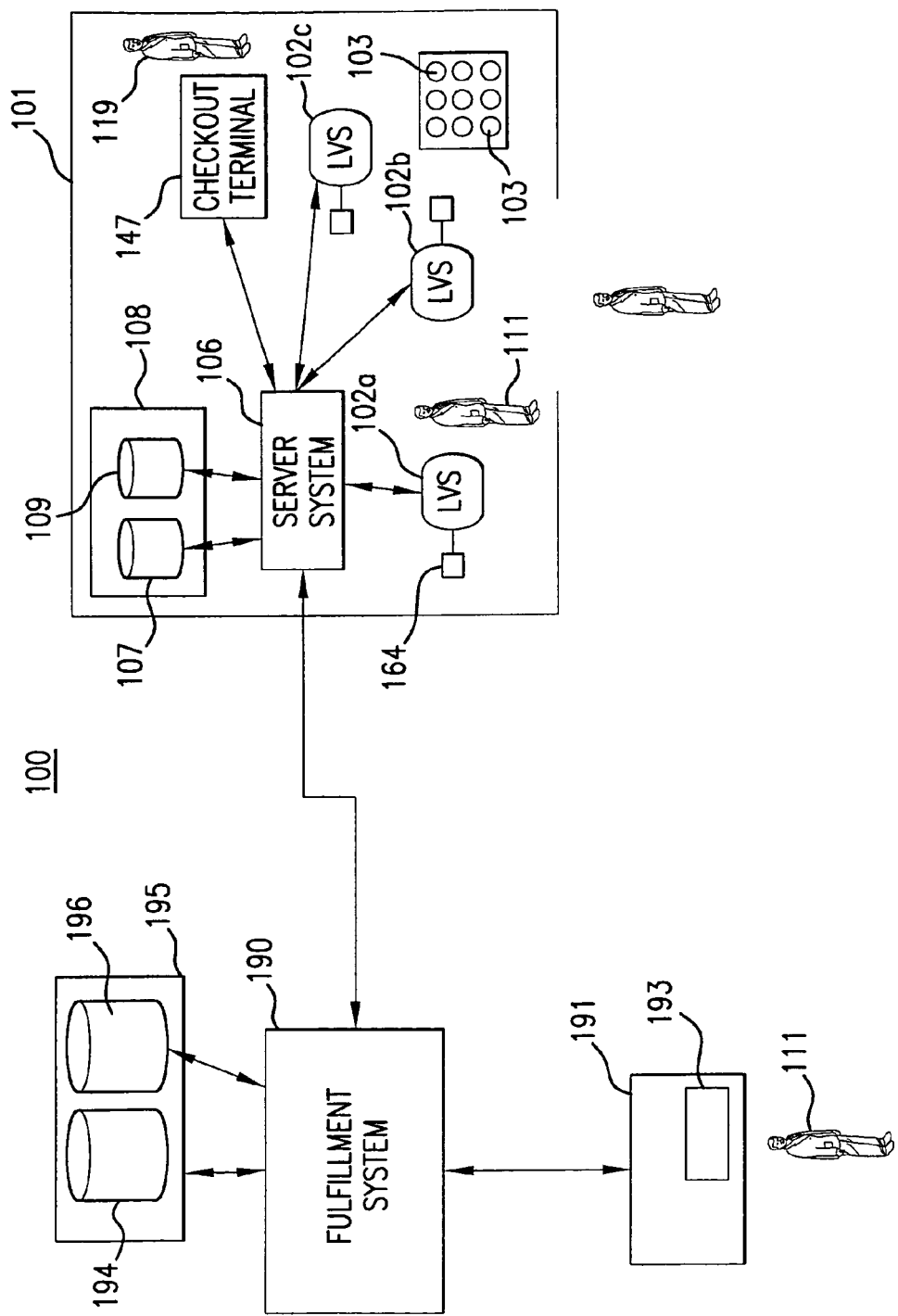
FIG. 1 is a functional block diagram of a retail digital asset purchasing system according to an embodiment of the present invention.

FIG. 1 is a functional block diagram of a retail digital asset purchasing system 100 according to an embodiment of the present invention. As shown in FIG. 1, a number of computer systems 102 (hereafter referred to as "listening and viewing stations" or "LVS" or "terminals") are distributed throughout a retail store 101, which, like most retail stores, may contain physical assets 103 that are available for purchase. In this example, physical assets 103 may include CDs, DVDs and other products.

As shown in FIG. 1, retail store 101 may also include a digital asset server system 106, but server system 106 need not be located in store 101. Preferably, each terminal or LVS 102 is coupled to server system 106 so that LVS 102 can transmit information to and receive information from server system 106. For example, in embodiments where server system 106 is located in store 101, a local area network (LAN) may be provided to couple each LVS 102 with server system 106. The LAN may be a wired and/or a wireless network.

Figure 2A:
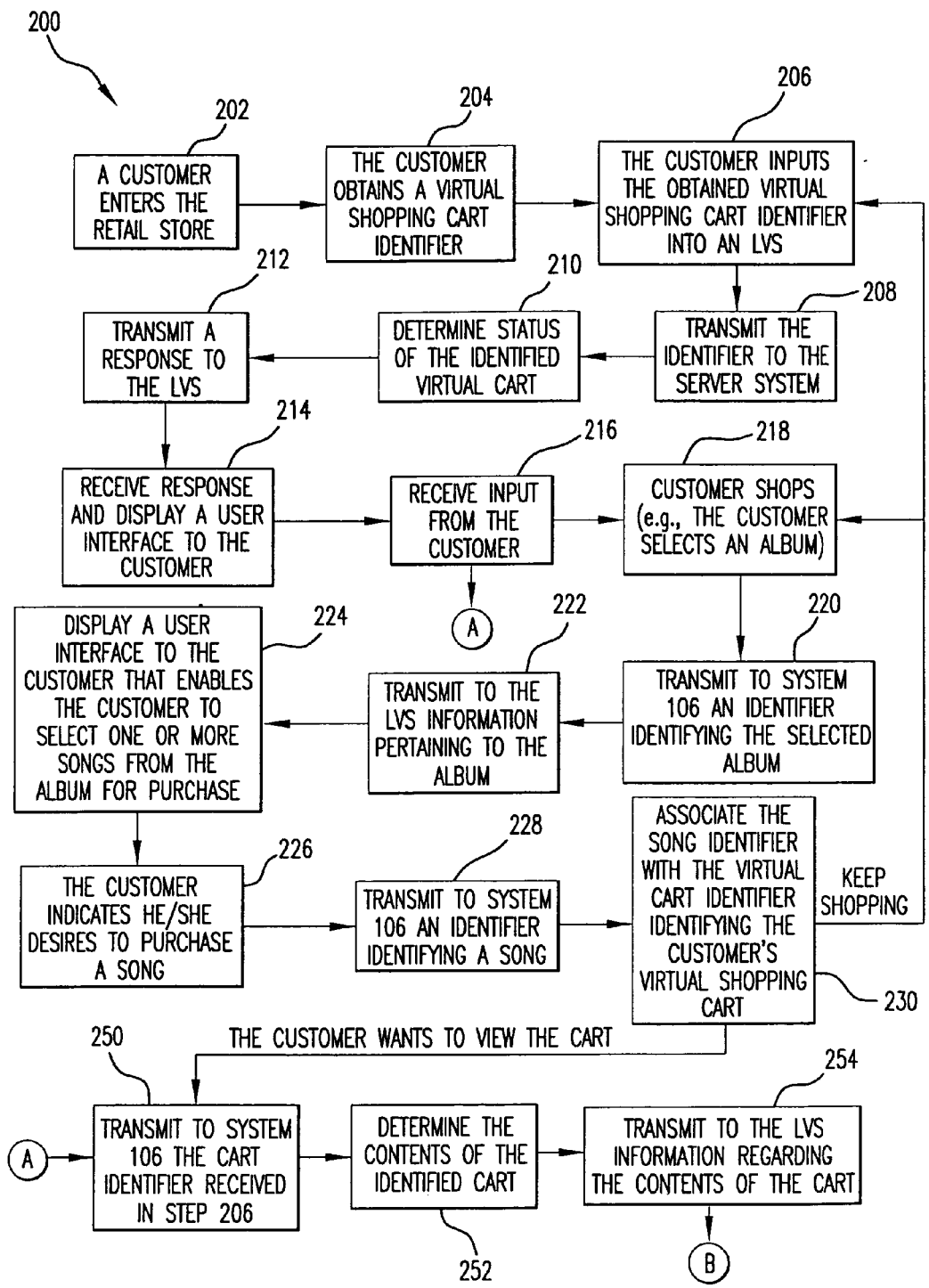
FIGS. 2A and 2B show a flow chart that illustrates a process according to an embodiment of the invention.
Figure 2B:
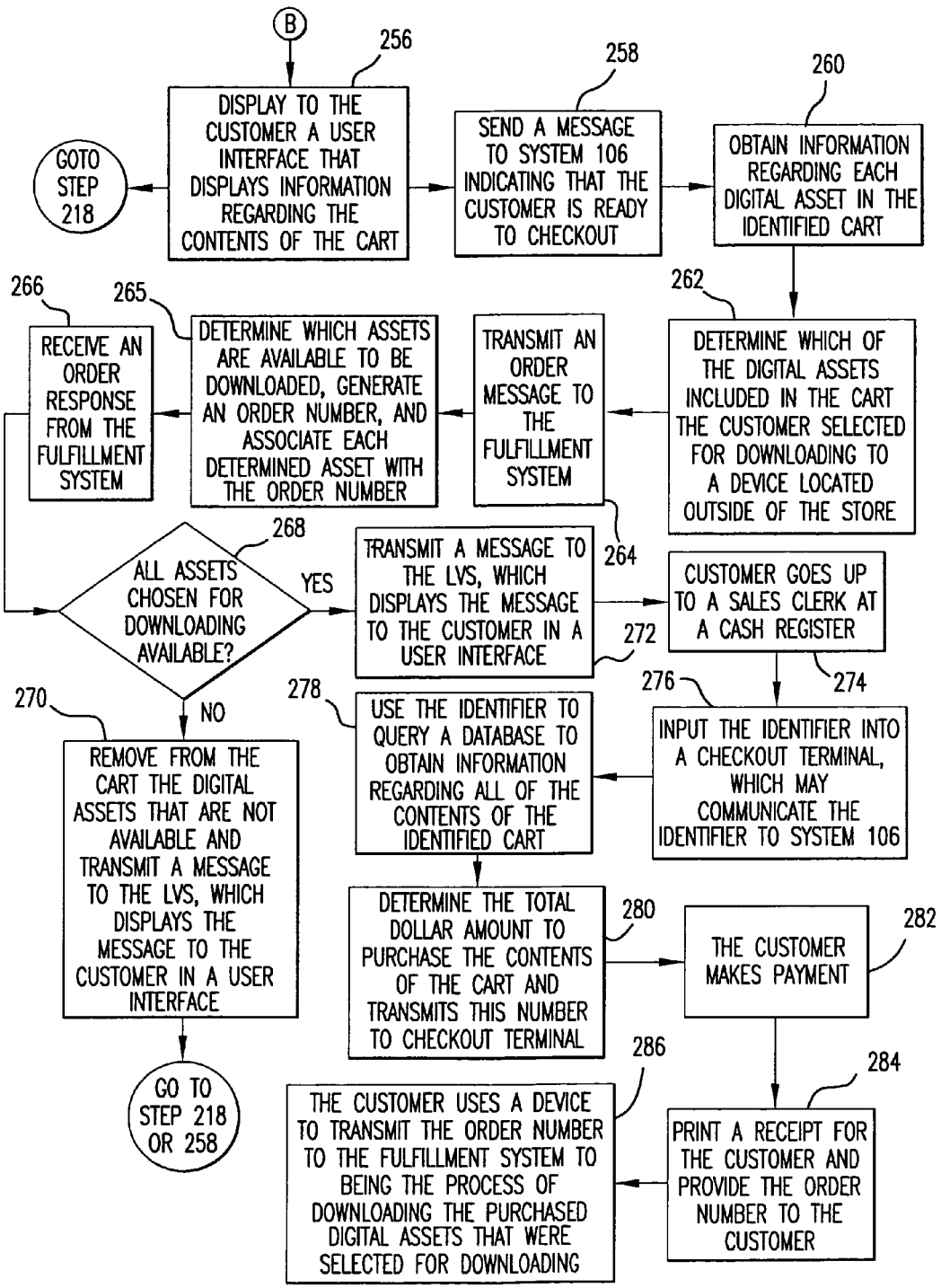

Referring now to FIGS. 2A and 2B, FIGS. 2A and 2B are a flow chart illustrating a process 200, according to an embodiment, for purchasing digital assets using system 100. Process 200 may begin in step 202, where a customer 111 enters retail store 101.

In step 204, customer 111 may obtain or create a virtual shopping cart identifier. The virtual shopping cart identifier may be any string of characters (e.g., numbers, letters or other characters). In one embodiment, shopping cards (e.g., flexible or rigid pieces of paper, cardboard, plastic, etc.) are distributed throughout the store, and each shopping card may have printed thereon a virtual shopping cart identifier. Thus, in some embodiments, in step 204, customer 111 obtains a virtual shopping cart identifier by obtaining a shopping card.

Referring back to FIG. 1, in some embodiments, one or more of the LVSs 102 may have a shopping card holder 164 attached thereto or positioned adjacent thereto. Shopping card holder 164 functions to hold shopping cards. In this manner, it is easy for a customer to obtain a virtual shopping cart identifier because the customer need only obtain a shopping card from a shopping card holder 164.

Figure 3:
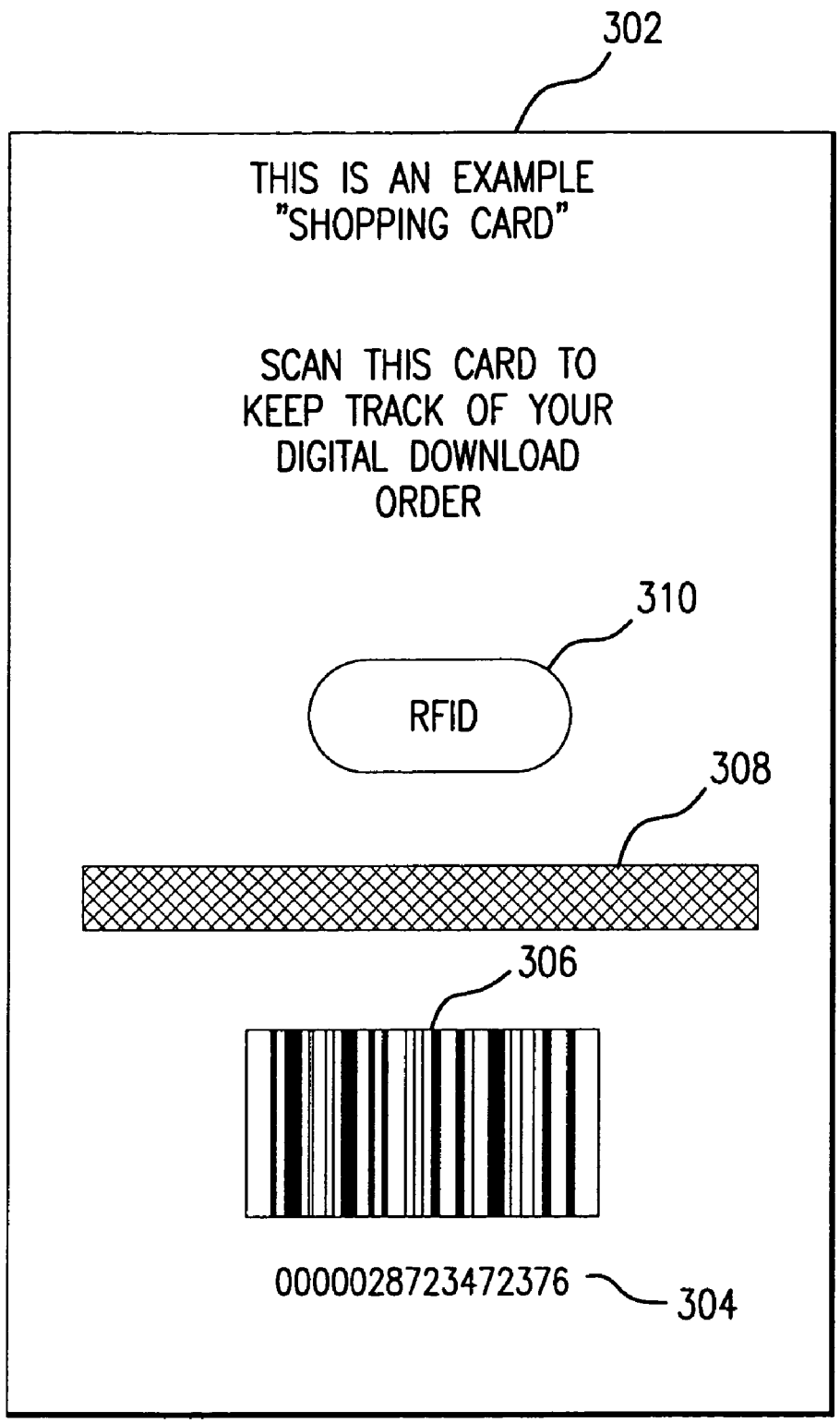
FIG. 3 illustrates an example shopping card.

Referring now to FIG. 3, FIG. 3 illustrates an example shopping card 302. As shown in FIG. 3, shopping card 302 may have a string of numbers 304 printed thereon. This string of numbers 304 is a virtual shopping cart identifier. As also shown in FIG. 3, a bar code 306 may be printed on shopping card 302. Preferably, bar code 306 corresponds to number 304. Card 302 may also include a magnetic strip 308 or an RFID circuit 310, each of which may store a virtual shopping cart identifier.

Referring back to FIG. 2A, after customer 111 obtains a virtual shopping chart identifier, process 200 may proceed to step 206.

In step 206, customer 111 may input an obtained or customer-created virtual shopping cart identifier into an LVS 102 (e.g., LVS 102a). Preferably, in embodiments where the identifier is encoded in a barcode or stored in a magnetic strip or RFID circuit or the like, each LVS 102 has a barcode scanner, magnetic strip reader, RFID reader, and/or the like, so that customer 111 need not manually input the identifier into the LVS. For example, when customer has obtained a shopping card having a barcode encoding a virtual cart identifier and the LVS has a barcode scanner, the customer need only place the barcode in the view of the barcode scanner in order to input the virtual cart identifier. In embodiments where the customer 111 creates his/her own cart identifier, the LVS may have a keyboard, keypad or the like that enables the customer to manually input the customer-created virtual shopping cart identifier. After customer 111 manually inputs the customer-created cart identifier, LVS 102a may transmit the identifier to system 106 and system 106 checks database 109 to determine whether the customer-created cart identifier is being used by another customer. If it is being used by another customer, customer 111 may be asked to input a new customer-created cart identifier.

In some embodiments, after step 206, LVS 102a may prompt customer 111 to select one or more digital asset formats. For example, in the case of audio digital assets, customer 111 may be prompted to select one or more audio encoding formats (e.g., WMA, MP3, AAC, etc.). This information may be used by system 100 to filter digital assets available for purchase so that the customer is given the option to purchase only those digital asset that are available in one of the formats selected by the customer. This feature is further described with reference to step 224 and icon 612 (see FIG. 6).

In step 208, LVS 102a may receive the inputted virtual cart identifier and transmit the identifier to server system 106 along with the formats selected by the customer, if any. In step 210, server system 106 receives the identifier and determines whether the virtual cart identified by the identifier is "empty" or "contains" one or more digital assets. That is, system 106 may determine whether the cart identifier is associated with a set of one or more digital assets in a virtual cart database 107. If database 107 does not associate any digital assets with the received identifier, then the virtual cart associated with the identifier is "empty," otherwise the cart "contains" the digital assets associated with the cart identifier.

In step 212, server system 106 transmits a response to LVS 102a. If it was determined that the cart is not empty, the response may include meta-information for each digital asset contained in the cart. In the embodiments where a digital asset is a song, the meta-information may be the title of the song, the artist, the price of the asset, and/or other information.

Figure 4:
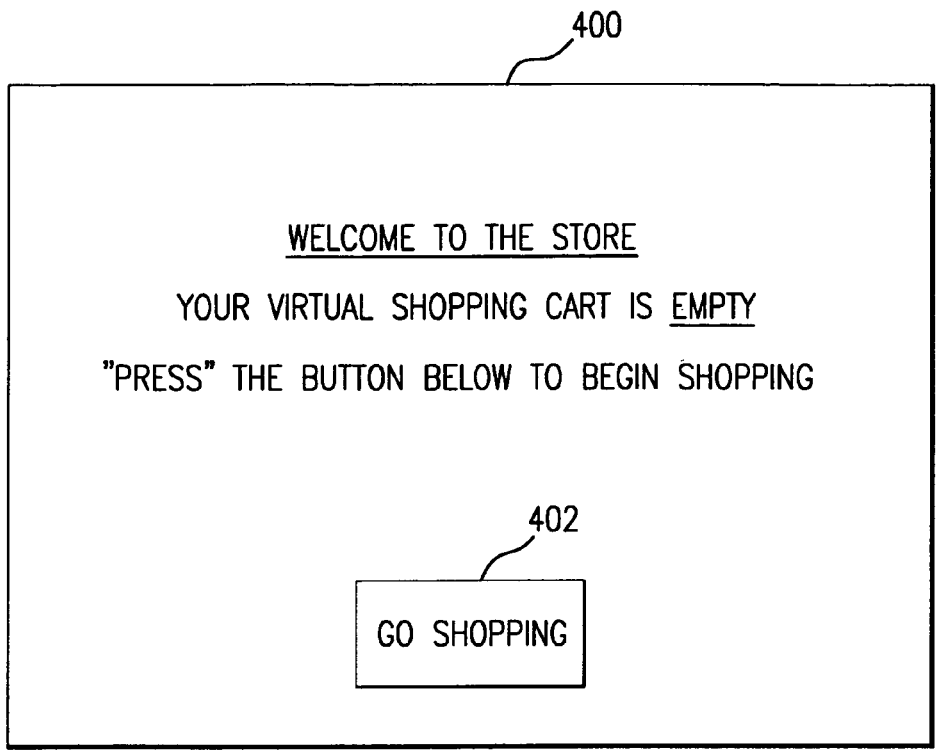
FIGS. 4-9 illustrate user interfaces according to embodiments of the invention.
Figure 5:
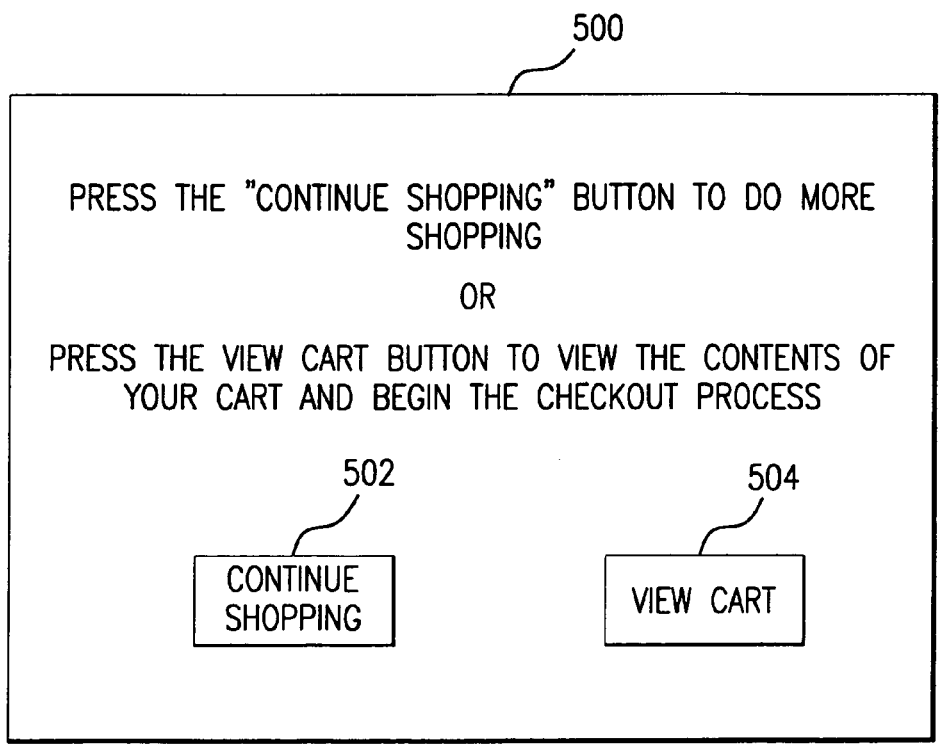

In step 214, LVS 102a receives the response and may display a user interface to the customer. FIG. 4 illustrates a user interface 400 that may be displayed to the customer when the customer's virtual cart is empty and FIG. 5 illustrates a user interface 500 that may be displayed to the customer when the customer's virtual cart contains one or more digital assets.

In step 216, LVS 102a receives input from the customer. For example, the customer may activate a button displayed in the user interface. In the case where interface 400 is displayed, the customer may activate "GO shopping" button 402, and in the case where interface 500 is displayed, the customer may activate "Continue Shopping" button 502 or "View Cart" button 504.

If the customer activates button 402 or 502, process 200 may proceed to step 218, and if the customer activates button 504, then process 200 may proceed to step 250.

In step 218, customer 111 shops. That is customer 111 may browse and search for digital assets to purchase. For example, in step 218, LVS 102a may display a user interface to the customer that enables the customer to locate and select digital assets for purchase. For example, in the case of shopping for music, the interface may enable the user to enter the name of an artist or select a genre of music. In some embodiments, the search for songs can be by title, artist, or any other criteria such as genres, mood, beat, similar to etc.

If the user enters the name of an artist (e.g., the band "U2"), then LVS 102a may transmit the entered artist's name to system 106 and receives a response therefrom. The response may include a list of all of the albums by the artist. This list may be displayed to the customer and the customer may select one of the listed albums.

For the sake of brevity, clarity and illustration, the following steps of process 200 will be described with reference to the purchase of music. The invention, however, is not limited to the purchase of any particular type of digital asset.

In response to the customer selecting a listed album, LVS 102a may transmit to system 106 an identifier identifying the selected album (step 220). Another possible way for a customer to select an album is to find in the store the CD corresponding to the album and scan the CD into the LVS. That is, the customer may position a barcode that is on a cover of the CD so that the barcode may be read by the LVS' barcode scanner, thereby identifying the album and causing the LVS to transmit the barcode to system 106.

In response to receiving an album identifier, system 106 may transmit to LVS 102a information pertaining to the album (step 222). This information may include the title of each song on the album. Additionally the information may include information pertaining to each song, such as whether the song is available for purchase (e.g., whether it is available in a format selected by the customer), the available purchase modes (e.g., digital download, copy to disk, copy to portable device, etc.), a purchase price associated with each purchase mode, the available purchase formats (e.g., MP3, AAC, WMA, etc.), and whether a sample of the song is available. The information transmitted in step 222 may be stored in database 109 or other database.

Preferably, a fulfillment system 190 periodically provides to system 106, directly or indirectly, some or all of the information described above, and system 106 updates database 109 with the information received. For example, fulfillment system 190, or part thereof, may be owned and/or operated by an entity that is different from the entity that owns and/or operates store 101 and the entity that owns/operates fulfillment system 190, or part thereof, may maintain a catalog of digital assets that are available for electronic purchase.

Accordingly, fulfillment system 190 may initially make the entire catalog available to system 106 and then periodically make available updates to the catalog so that system 106 will have up-to-date information regarding which digital assets are available for electronic purchase and the purchase modes and formats available for those digital assets.

Figure 6:
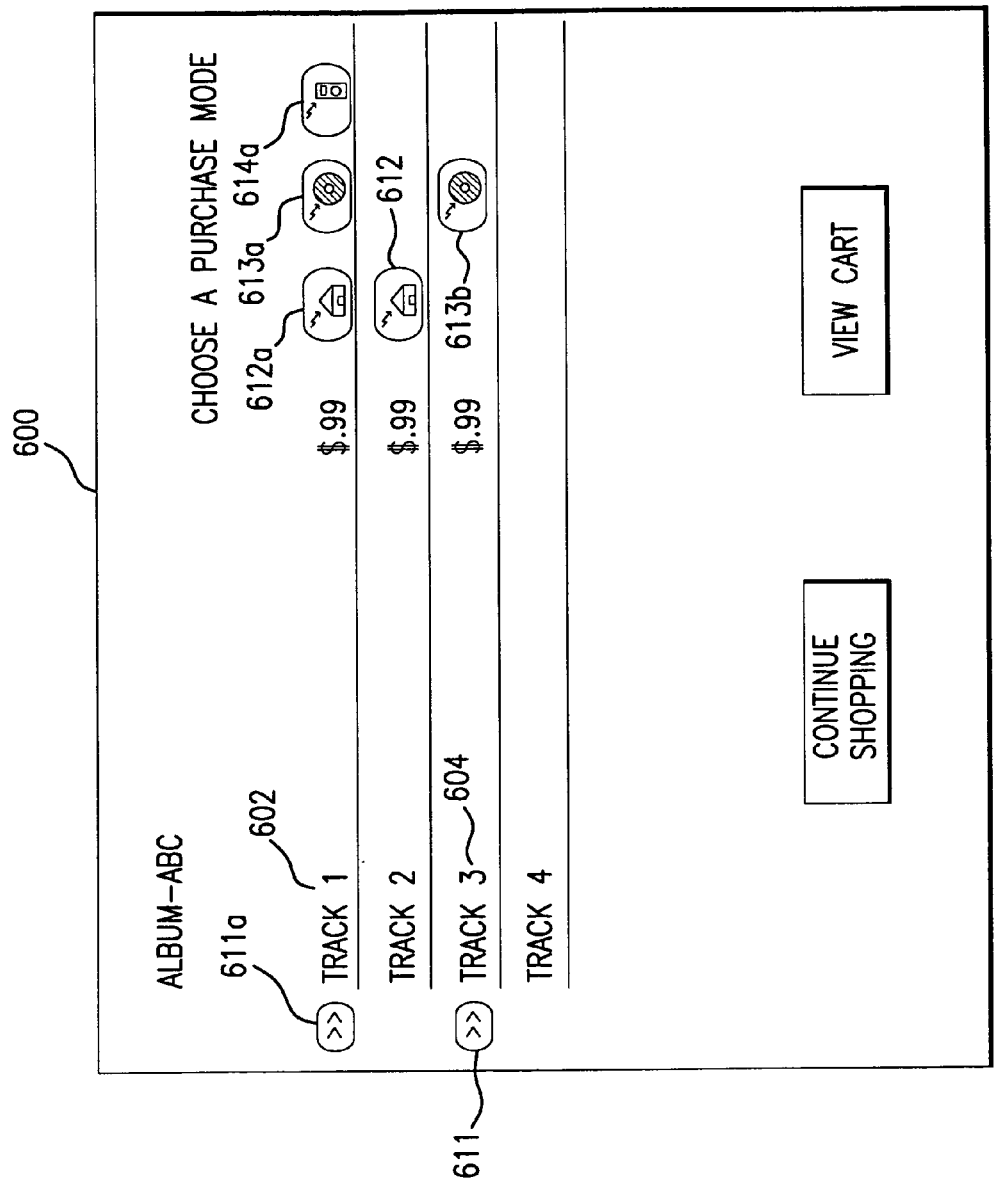

In step 224, after receiving the information from system 106, LVS 102a may display a user interface to customer 111 that enables the customer to select one or more songs from the album for purchase. FIG. 6 illustrates an example user interface 600 that may be displayed in step 224.

As shown in FIG. 6, user interface 600 displays a list of song titles. As further shown in FIG. 6, zero or more of the song titles may have one or more icons or other indicators next to the song title. For example, next to song title 602 there is a first icon 611a, a second icon 612a, a third icon 613a and a fourth icon 614a.

If icon 611 is next to a song title, it means that a sample of the song identified by the title is available to be sampled. If icon 612 is next to a song title, it means that the identified song may be available to be purchased and downloaded to a device located outside of the store 101 (e.g., in the customers home). In some embodiments, a song title may be available for purchase only in a certain format or formats (e.g., WMA and/or MP3), and in some embodiments, as discussed above, before the customer begins shopping, system 100 may ask the customer to select one or more formats. In these embodiments, icon 612 may be displayed next to a song title only if the song title is available in one of the customer's selected formats. So, for example, if a song is available only in the MP3 format, but the customer has indicated that he/she is willing to buy songs only in the WMA format, then icon 612 will not be displayed next to that song title. In this way, the customer will be given the option to purchase only those digital assets that are available in a format selected by the customer.

If icon 613 is next to a song title, it means that the identified song may be available to be purchased and stored (e.g., "burned") onto a CD or other storage media within the store in a format selected by the customer. And if icon 614 is next to a song title, it means that the identified song may be available to be purchased and stored (e.g., "burned") onto one of the customer's portable devices in a format selected by the customer.

Figure 12:
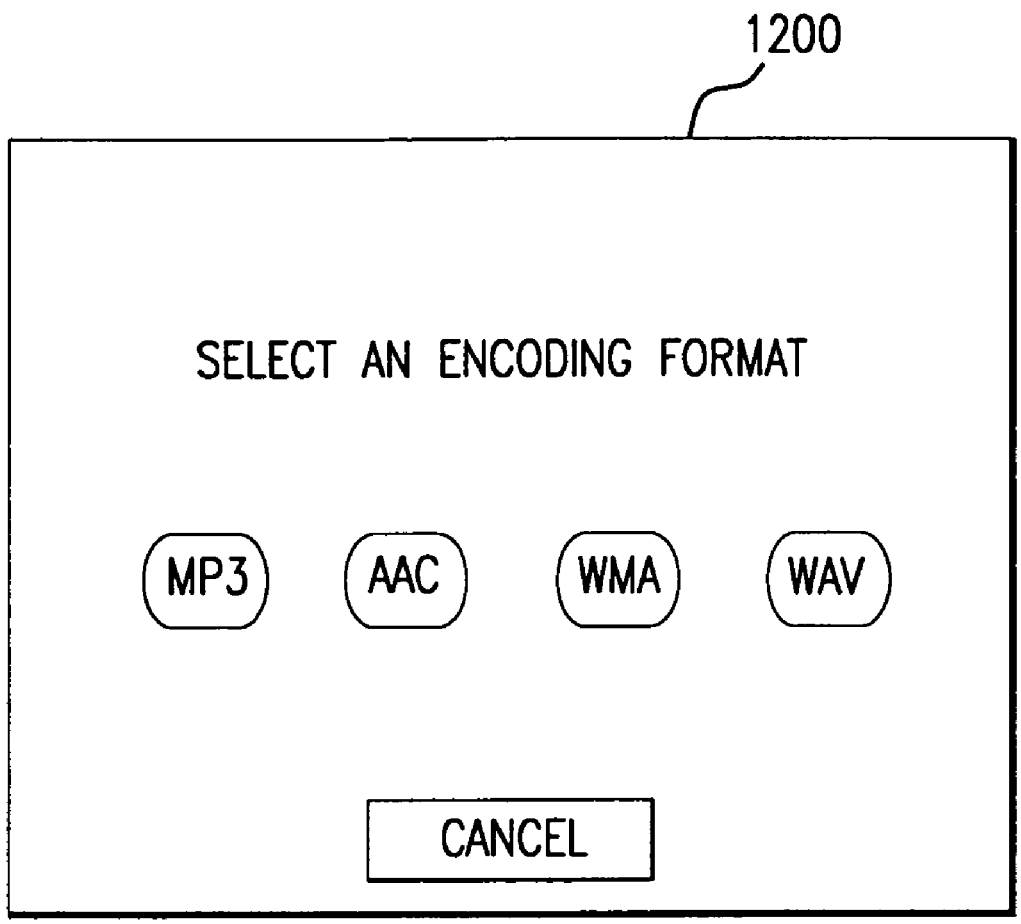
FIG. 12 illustrates an example user interface that may be displayed to a customer in response to the customer selecting a song for purchase.

To purchase a song, customer may "click" on icon 612, 613 and/or 614 that is displayed adjacent to the song's title. For example, to purchase song 604, customer 111 may click on icon 613b. When a song, such as song 602 or 604, is selected to be purchased, the song is added to customer 111's virtual shopping cart. That is, the song title or other song identifier may be associated with the shopping cart identifier identifying customer 111's virtual shopping cart. In some embodiments, before the song is added to the shopping cart, the LVA displays a user interface that enables the customer to select an audio encoding format (e.g., MP3, AAC, WMA, etc.) for the song. FIG. 12 illustrates an example user interface 1200 that may be displayed to the customer in response to the customer selecting a song for purchase. As shown, in FIG. 12, the customer can select an encoding format for the song.

In some embodiments, in response to customer 111 indicating that he/she desires to purchase a song (step 226), LVS 102a transmits to system 106 an identifier identifying the song (step 228), the chosen purchase mode (if more than one purchase mode is available), and the chosen encoding format (if more than one encoding format is available). In some embodiments, before LVS 102a performs set 228, LVS 102a may ask the customer input a cart identifier (preferably, the cart identifier inputted in step 206). That is, in some embodiments, every time a customer wants to add a digital asset to his/her cart, the customer is required to input the virtual cart identifier identifying customer 111's virtual shopping cart. The cart identifier inputted in step 206 or inputted after step 226 may also be transmitted in step 228.

In step 230, system 106 associates the song identifier with the virtual cart identifier identifying customer 111's virtual shopping cart. In step 230, system 106 may update database 107 so that, for example, a record in database 107 associates the song identifier with the virtual cart identifier. That is, system 106 adds the selected digital asset to the customer's virtual cart.

After step 230, the customer may continue shopping using LVS 102a, may move to different part of the store and continue shopping using a different LVS 102, such as, for example, LVS 102b, or indicate that the customer wants view the content of his/her virtual cart, in which case process 200 may proceed to step 250. Preferably, before a customer leaves an LVS 102 that the customer has been using to shop for digital assets, the customer should "inform" the LVS 102 that the customer is leaving the LVS 102. For example, the customer may want to activate a "sign off" button or like that is displayed by the LVS 102 before leaving the LVS 102. In some embodiments, when the customer wants to continue shopping at another LVS 102, the customer must input into the LVS 102 the customer's virtual shopping cart identifier (i.e., process 200 returns to step 206).

Referring back to FIG. 5, and assuming the customer is still using LVS 102a, if customer 111 activates button 504 ("View Cart"), then process 200 may proceed to step 250. In step 250, LVS 102a transmits to system 106 the cart identifier received in step 206. In response, system 106 searches database 107 to determine the contents of the identified cart (e.g., the set of digital assets that customer 111 has added to the cart) (step 252). In step 254, system 106 transmits to LVS 102a information regarding the contents of the cart. In step 256, LVS 102a displays to the customer a user interface that displays information regarding the contents of the customer's cart.

Figure 7:
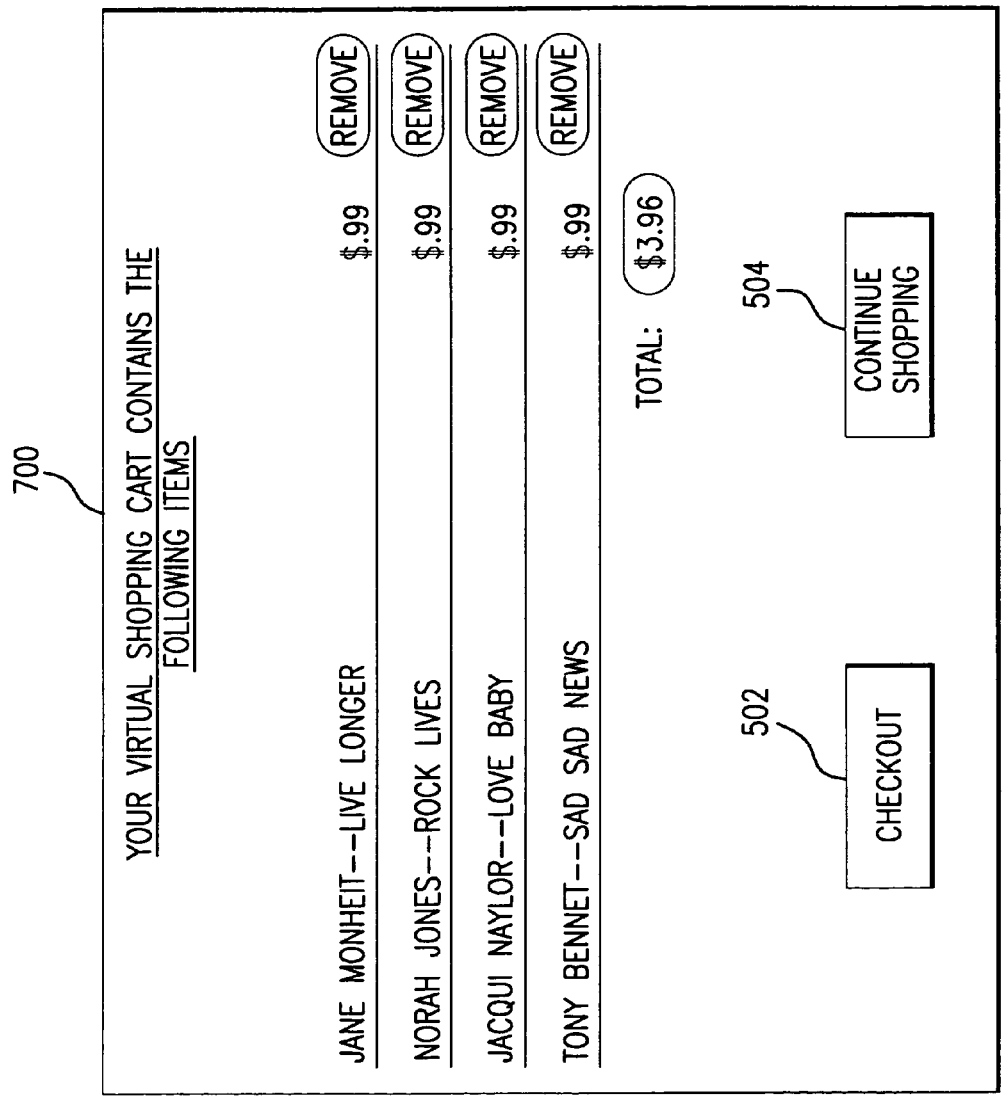

FIG. 7 illustrates an example user interface 700 that may be displayed in step 256. As shown in FIG. 7, interface 700 is an interface that enables the customer to review the items placed in his/her cart. Using interface 700, the customer can review the price for each digital asset and can remove an item from the cart. Once the customer is satisfied with the contents of the cart, the customer can activate "Checkout" button 702. Otherwise, the customer can activate "Continue Shopping" button 704 and continue shopping.

In response to the customer activating "checkout" button 702, LVS 102a may send a message to system 106 indicating that the customer is ready to checkout the contents of his/her virtual cart (step 258). Accordingly, the message may include the virtual cart identifier so that system 106 will know which cart is ready for checkout.

In step 260, system 106 may use the identifier to query database 107 to obtain information regarding each digital asset in the identified cart. In step 262, system 106 may use the information obtained in step 260 to determine which of the digital assets included in the cart the customer selected for downloading to a device located outside of the store 101. For example, the customer may want burned onto a CD one or more of the digital assets included in the cart, and the customer may want to download to a device not located in the store 101 one or more other digital assets included in the cart.

In step 264, system 106 may transmit an order message to fulfillment system 190. The order message includes information regarding the digital assets in the cart that the customer selected for downloading. For example, the information may include, for each such digital asset, an asset identifier identifying the asset. After receiving the order message, fulfillment system 190 may determine which of the identified assets is available to be downloaded by a customer, generate an order confirmation code or "download code", and associate with the download code each asset that is available to be downloaded (step 265).

In step 266, system 106 may receive from fulfillment system 190 an order response message containing information as to which of the identified digital assets are still available for downloading. If all of the digital assets identified in the order message are still available for downloading, then the order response message may include an order confirmation code.

After receiving the order response message, system 106 uses the information therein to determine whether all of the digital assets the customer selected for downloading are still available (step 268). If no, step 270 is performed and if yes, then step 272.

Figure 8:
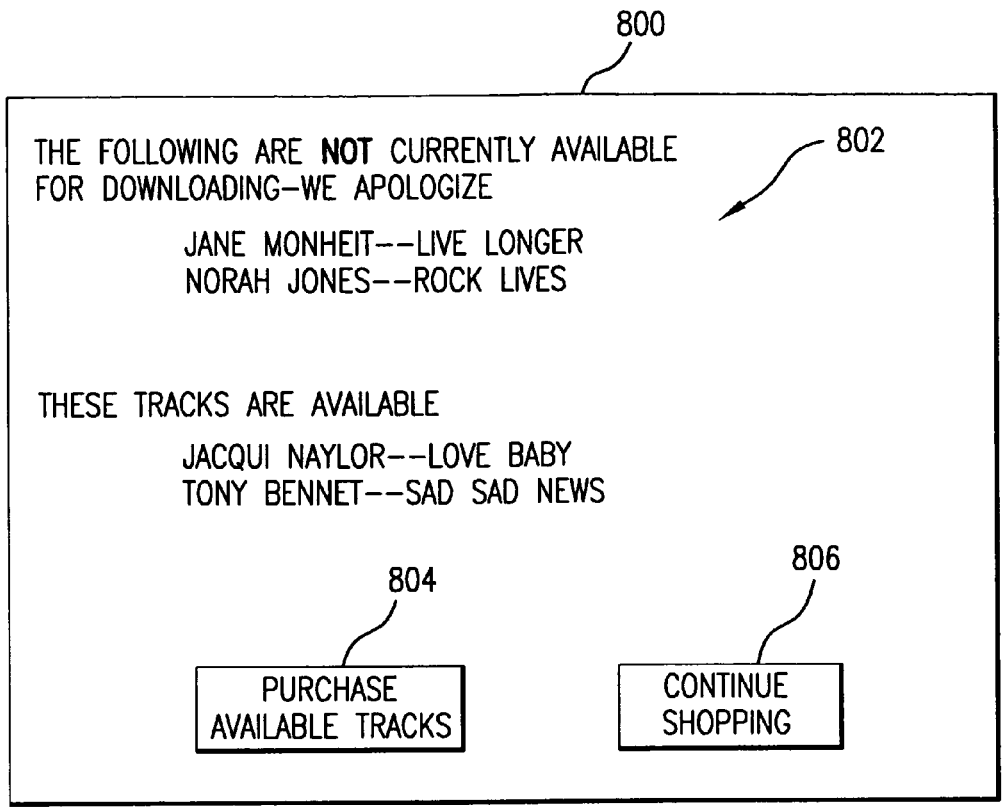

In step 270, system 106 may remove from the cart the digital assets that are not available and transmit a message to the LVS 102a, which displays the message to the customer in a user interface. FIG. 8 illustrates a user interface 800 that may be displayed in step 270. As shown in FIG. 8, interface 800 includes a message 802 that indicates which of the digital assets are available and which are not. Interface 800 may also include a "purchase available tracks" button 804 and a "continue shopping" button 806. If button 804 is selected, then process 200 may go back to step 258. If button 806 is selected, then process may go back to step 218.

Figure 9:
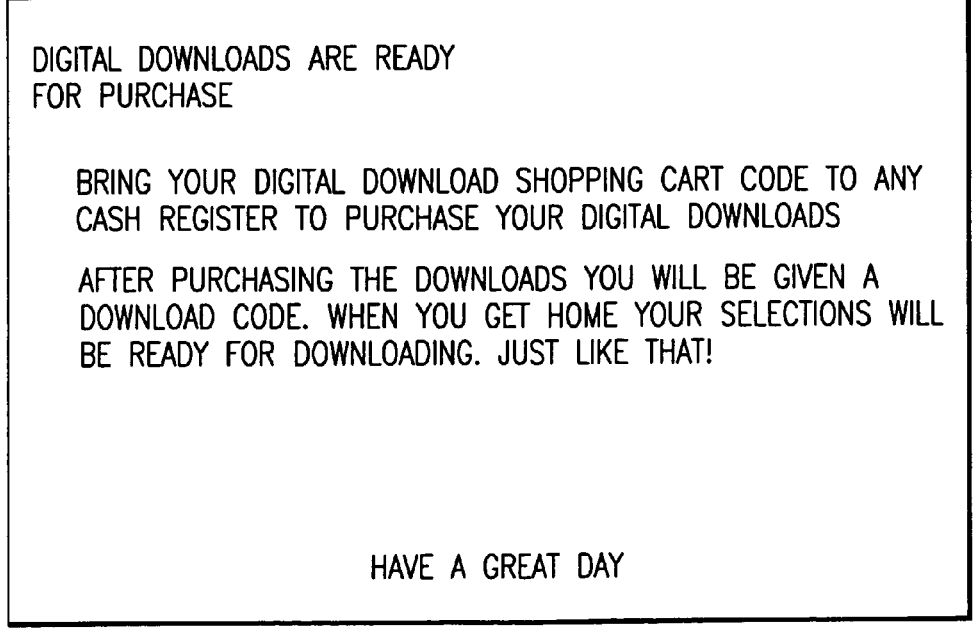

In step 272, system 106 may transmit a message to the LVS 102a, which displays the message to the customer in a user interface. FIG. 9 illustrates a user interface 900 that may be displayed in step 272. As shown in FIG. 9, interface 900 may include a message asking the customer to go to the checkout line and provide the sales clerk with the customer's cart identifier.

In step 274, customer 111 goes up to a sales clerk 119 at a checkout terminal 147. In step 274, customer 111 informs the sales clerk of the cart identifier that identifies customer 111's virtual cart. For example, customer 111 may hand the clerk the shopping card, discussed above, which has the identifier printed thereon and/or stored therein.

In step 276, the clerk inputs the identifier into the checkout terminal 147, which may communicate the identifier to system 106. System 106 may use the identifier to query database 107 to obtain information regarding all of the contents of the identified cart (step 278).

In step 280, system 106 determines the total dollar amount to purchase the contents of the cart and transmits this number to checkout terminal 147, where the number may be displayed to the customer. The order confirmation code received from fulfillment system 190 may also be transmitted in step 280. In step 282, the customer makes payment (e.g., by cash, credit card, prepaid card, etc.).

After the customer makes payment, checkout terminal 147 prints a receipt for the customer (step 284) and the customer is informed of the order confirmation code. Preferably, the order confirmation code is printed on the receipt. Additionally, instruction(s) for downloading the digital asset(s) the customer purchased for downloading may also be printed on the receipt.

Additionally, if the customer purchased digital assets to be burned on to a CD, then system 106 may automatically burn the CD after payment is received or the sales clerk can burn the CD. Similarly, if the customer purchased digital assets to be stored in a portable device that is with the customer, the customer or sales clerk may connect the portable device to system 106, thereby enabling system 106 to copy the purchased digital assets to the portable device.

After receiving the order confirmation code, the customer may use a device (e.g., device 191) to communicate with fulfillment system 190 to download the purchased digital assets that were selected for downloading (step 286). More specifically, in step 286, the customer may input into device 191 the order confirmation code and device 191 transmits this number to the fulfillment system 190. The fulfillment system 190 uses the order confirmation code to find the customer's order. That is, as discussed above with respect to step 265, fulfillment system 190 may associate the purchased digital assets with the order number using an "orders" database 196 for example. Once the order has been found, fulfillment system 190 may retrieve from a storage device 195 the assets associated with the order number and then transmit to device 191 the retrieved digital assets.

Device 191 may be a desktop computer, a laptop computer, a mobile phone, a digital assistant, or any other device capable of storing a digital asset and communicating with fulfillment system 190. The customer may use software 193 stored on device 191 to communicate with fulfillment system 190. Software 193 may be a conventional browser or custom software (e.g., a browser or media-player plug-in).

In some embodiments, the digital assets downloaded in step 286 can not be used unless the customer receives a license. In these embodiments, software 193 may transmit to fulfillment system 190 information concerning device 191, which information may include an identifier associated with device 191. Fulfillment system may then obtain the appropriate license and transmit the license to device 191.

The above described method for purchasing digital assets is advantageous for at least the following reason. It allows for customer to purchase digital assets for downloading anonymously. That is the customer need not have or provide a username or a previously established account to download digital assets using system 100. At most, in some circumstances, the only "customer" information transmitted to system 100 is information identifying the customer's device 191 (and/or software stored thereon). Another advantage of system 100 is that it enables a customer to purchase physical assets (CD's, DVDs, etc.) while at the same time purchase digital assets that the user can later download to device 191 or other device from a fulfillment system 190. Other advantages also exist.

Figure 10A:
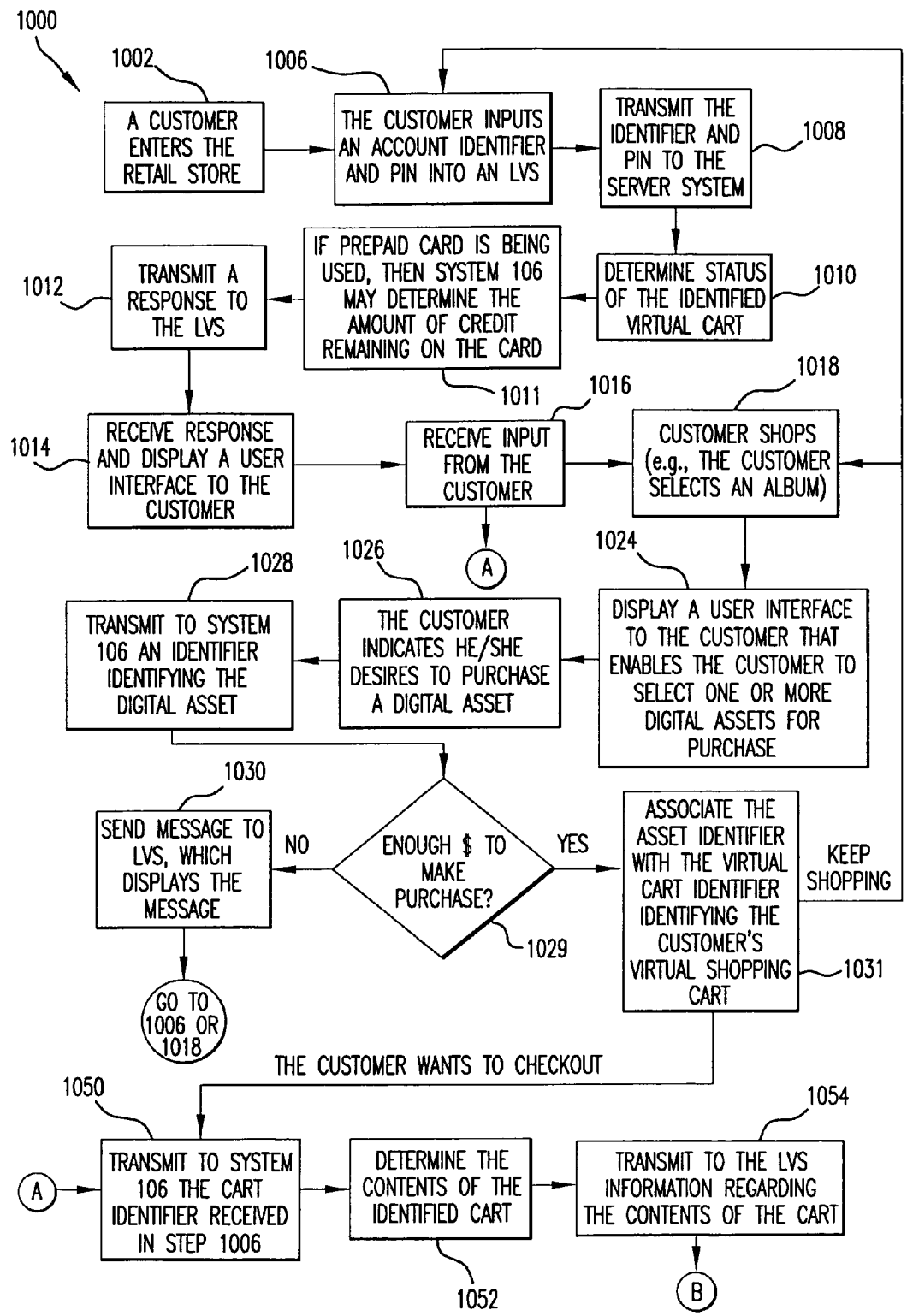
FIGS. 10A and 10B show a flow chart that illustrates a process according to an embodiment of the invention.
Figure 10B:
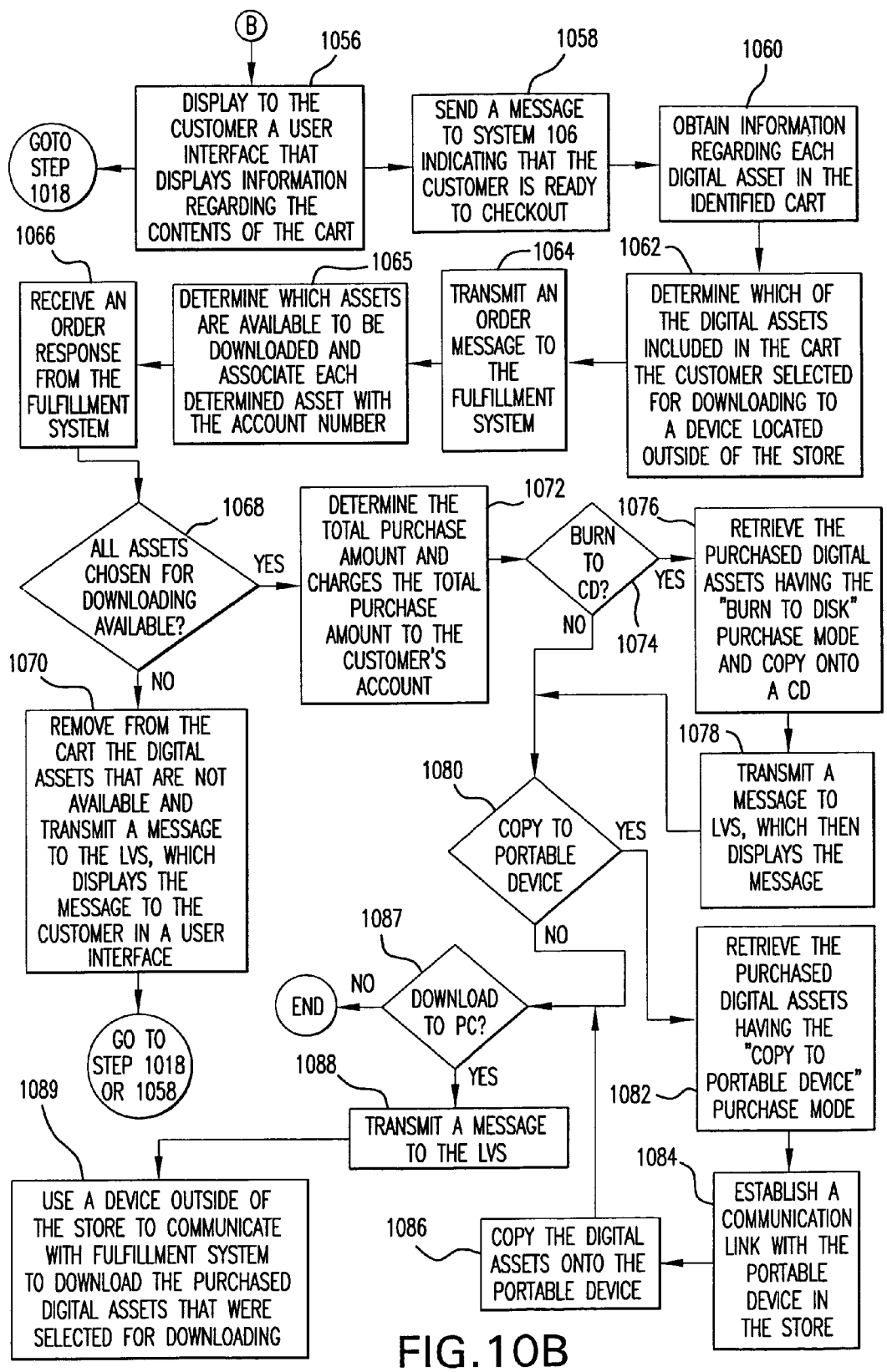

Referring now to FIGS. 10A and 10B, these figures illustrate a process 1000, according to another embodiment, for purchasing digital assets using system 100. Process 1000 may begin in step 1002, where a customer 111 enters retail store 101.

In step 1006, customer 111 may input an account identifier into an LVS 102 (e.g., LVS 102a). The account identifier may be a credit card number, a debit card number, an identifier associated with a gift card or other prepaid card previously purchased by the customer and issued by the entity that owns/operates the store, or, if the user has opened an account or "membership" with the entity that owns/operates the store, the customer's membership number. As discussed above, each LVS 102 may have a barcode scanner, magnetic strip reader, RFID reader, and/or the like, so that customer 111 need not manually input the account identifier into the LVS. For example, if the customer is a member, the customer should have a membership card having the membership number printed, encoded, and/or stored in or on the membership card. In step 1006, customer 111 may also input a PIN number or password (hereafter PIN) into the LVS.

In step 1008, LVS 102a may receive the inputted account identifier and PIN and transmit the identifier and PIN to server system 106. In step 1010, server system 106 receives the identifier and PIN determines whether the account identifier is associated with a set of one or more digital assets in a virtual cart database 107. If database 107 does not associate any digital assets with the received account identifier, then a "virtual cart" associated with the identifier is "empty," otherwise the cart "contains" the digital assets associated with the account identifier. In step 1011, system 106 may determine whether the account identifier identifies a prepaid card. If it does, then system 106 may determine the amount of credit remaining on the card by, for example, querying a prepaid account database.

In step 1012, server system 106 transmits a response to LVS 102a. If it was determined that the cart is not empty, the response may include meta-information for each digital asset contained in the cart. Additionally, if the account identifier is associated with a prepaid card, the response may include information regarding the amount of money remaining on the prepaid card.

In step 1014, LVS 102a receives the response and may display a user interface to the customer. User interface 400 may be displayed to the customer when the customer's virtual cart is empty and user interface 500 may be displayed to the customer when the customer's virtual cart contains one or more digital assets. Although not shown in interface 400 or 500, if the account identifier is associated with a prepaid card and the response from system 106 includes information regarding the amount of money remaining on the prepaid card, then a message indicating this amount may be displayed in user interface 400 and 500 so that the customer will know exactly how much money he can spend using the prepaid card.

In step 1016, LVS 102a receives input from the customer. If the customer activates button 402 or 502, process 1000 may proceed to step 1018, and if the customer activates button 504, then process 1000 may proceed to step 1050.

In step 1018, customer 111 shops. In step 1024, LVS 102a may display a user interface to customer 111 that enables the customer to select one or more digital assets for purchase. User interface 600 may be displayed in step 1024. In some embodiments, one or more audio encoding formats may be associated with the customer 111's account identifier. For example, database 194 may associate one or more selected audio encoding formats with the customer's account identifier. In these embodiments, system 100 may give customer 111 the option of purchasing only those songs that are available in one of the customer selected formats. For example, in some embodiments, a song may be available for purchase only in a certain format or formats (e.g., WMA and/or MP3). In these embodiments, referring to FIG. 6, icons 612, 613 and/or 613 may be displayed next to a song title only if the song title is available in one of the customer's selected formats. So, for example, if a song is available for download only in the WMA format, but the WMA format is not associated with the customer's account identifier (e.g, the customer is willing to buy songs only in the AAC format), then icon 612 will not be displayed next to that song's title. In this way, the customer will be given the option to purchase only those digital assets that are available in a format selected by the customer.

In response to customer 111 indicating that he/she desires to purchase a digital asset (step 1026), LVS 102a transmits to system 106 an identifier identifying the digital asset (step 1028) and a customer selected purchase mode (if more than one purchase mode is available). The account identifier inputted in step 1006 may also be transmitted in step 1028.

If the account identifier is associated with a prepaid card, then system 106 may determine whether there is enough money on the card to purchase the selected digital asset and all of the other, if any, digital assets included in the customer's virtual cart (step 1029). If there is enough money, step 1031 may be performed, otherwise step 1030 may be performed. In step 1030, system 106 transmits a message to LVS 102a, which displays the message. Preferably, the message indicates that there is not enough money on the prepaid card to add the selected digital asset to the cart and informs the customer that he/she will need to remove one or more digital assets from the cart in order to purchase the selected digital asset.

In step 1031, system 106 associates the digital asset identifier with the account number entered in step 1006 (hereafter "the virtual cart identifier"). That is, system 106 adds the selected digital asset to the customer's virtual cart.

After step 1031, the customer may continue shopping using LVS 102a, may move to different part of the store and continue shopping using a different LVS 102, such as, for example, LVS 102b, or indicate that the customer wants to view the contents of his/her virtual cart, in which case process 1000 may proceed to step 1050. In some embodiments, when the customer wants to continue shopping at another LVS 102, the user must input into the LVS 102 the virtual shopping cart identifier (i.e., process 1000 returns to step 1006).

In step 1050, LVS 102a transmits to system 106 the account identifier received in step 1006. In response, system 106 searches database 107 to determine the contents of the cart associated with the account identifier (e.g., the set of digital assets that customer 111 has added to the cart) (step 1052). In step 1054, system 106 transmits to LVS 102a information regarding the contents of the cart. In step 1056, LVS 102a displays to the customer a user interface that displays information regarding the contents of the customer's cart. User interface 700 may be displayed in step 1056.

In response to the customer activating "checkout" button 702, LVS 102a may send a message to system 106 indicating that the customer is ready to checkout the contents of his/her virtual cart (step 1058). Accordingly, the message may include the virtual cart identifier so that system 106 will know which cart is ready for checkout.

In step 1060, system 106 may use the identifier to query database 107 to obtain information regarding each digital asset in the identified cart. In step 1062, system 106 may determine which of the digital assets included in the cart the customer selected for downloading to a device located outside of the store 101.

In step 1064, system 106 may transmit an order message to fulfillment system 190. The order message includes information regarding the digital assets in the cart that the customer selected for downloading. The message may also include the account number and PIN inputted in step 1006. After receiving the order message, fulfillment system 190 may determine which of the identified assets is available to be downloaded by a customer and associate with the account number and PIN each asset that is available to be downloaded (step 1065).

In step 1066, system 106 may receive from fulfillment system 190 an order response message containing information as to which of the identified digital assets are still available for downloading.

After receiving the order response message, system 106 uses the information therein to determine whether all of the digital assets the customer selected for downloading are still available (step 1068). If no, step 1070 is performed and if yes, then step 1072.

In step 1070, system 106 may remove from the cart the digital assets that are not available and transmit a message to the LVS 102a, which displays the message to the customer in a user interface. User interface 800 may be displayed in step 1070. If button 804 is selected, then process 1000 may go back to step 1058. If button 806 is selected, then process may go back to step 1018.

In step 1072, system 106 determines the total purchase amount and charges the total purchase amount to the account identified by the identifier entered in step 1006. For example, if the account identifier is a credit-card number, then system 106 may initiate a credit-card transaction and charge the total purchase price to the card. Similarly, if the account identifier is a membership number, then system 106 may charge the total purchase amount to a credit-card or other credit or debit account associated with the membership number. Assuming system 106 is successfully able to charge the total purchase price, then process 1000 may continue to step 1074.

In step 1072, instead of automatically charging the total purchase price, system 100 may allow the customer to choose the purchase method (e.g., charge to an account or pay by cash). If the customer elects to pay by cash, then LVA 102a may display a message to the customer asking the customer to go to a checkout terminal 147. Once at the checkout terminal 147, the customer's account identifier is inputted into the checkout terminal. Checkout terminal 147 may then communicate the account identifier to server system 106 so that server system 106 can determine the assets in the customer's virtual cart and the total purchase amount. Information indicating the total purchase amount may then be transmitted from server 106 to checkout terminal 147 and then customer 111 pays by cash. After the cash is received at checkout terminal 147, terminal 147 may transmit a "transaction complete" message to server 106 and process 1000 may continue to step 1074.

In step 1074, system 106 determines whether the purchase mode for any of the purchased digital assets is "burn to disk." If yes, process 1000 may proceed to step 1076. In step 1076, system 106 retrieves from a storage device 108 the purchased digital assets having the "burn to disk" purchase mode and copies the digital assets to a CD, DVD or other storage medium (hereafter "CD"). In step 1078, system 106 transmits a message to LVS 102a, which then displays the message. The message may inform the customer to go to a "pick-up" counter to pick up the CD.

In step 1080, system 106 determines whether the purchase mode for any of the purchased digital assets is "copy to portable device." If yes, process 1000 may proceed to step 1082. In step 1082, system 106 retrieves from the storage device 108 the purchased digital assets having the "copy to portable device" purchase mode. In step 1084, the customer is instructed to establish a communication link between the portable device and system 100 (e.g., a communication link between the portable device and LVS 102a and/or system 106).

For example, if LVS 102a has a USB port, the customer can use a USB cable to establish a USB connection with LVS 102a, or, if the portable device and system 100 have wireless capabilities (e.g., Bluetooth or WiFi), then the portable device may connect to system 100 wirelessly. Once the communication link is established, system 100 can be copy the digital assets onto a non-volatile storage medium in the portable device (step 1086). Additionally, if a license is required to use the digital assets, then, in step 1086, system 100 may also copy the required licenses onto the portable device.

In step 1087, system 106 determines whether the purchase mode for any of the purchased digital assets is "download to PC." If yes, process 1000 may proceed to step 1088. In step 1088, system 106 may transmit a transaction complete message to fulfillment system 190, which message may include the account identifier and an indication that payment has been received or the customer's account has been successfully charged and may transmit a message to the LVS 102a, which displays the message to the customer in a user interface. The message preferably includes instruction(s) for downloading the digital asset(s) the customer purchased for downloading. In some embodiments, shopping cards may be spread throughout the store 101 and the instructions for downloading the digital assets may be printed thereon.

In step 1089, the customer may use a device (e.g., device 191) to communicate with fulfillment system 190 to download the purchased digital assets that were selected for downloading. More specifically, in step 1089, the customer may input into device 191 the same account number and PIN inputted in step 1006 and device 191 transmits this information to the fulfillment system 190. The fulfillment system 190 uses the account number to find the customer's order and checks to see whether the received PIN matches the PIN received in the order message from system 106. Assuming the PINs match and the customer's order has been found, then fulfillment system 190 may retrieve from a storage device 195 the assets associated with the account number and then transmit to device 191 the retrieved digital assets.

As discussed above with reference to process 200, the customer may use software 193 stored on device 191 to communicate with fulfillment system 190. Additionally, the customer may configure to software to automatically download from fulfillment system 190 purchased digital assets. For example, the customer can input into the software the account number/PIN inputted in step 1006 and the software can store this information on the device 191. Then, periodically, software can transmit the account number/PIN to fulfillment system 190, and then download from system 190 the digital assets associated with the account number. In this way, the customer can purchase digital assets while in store 101 and, by the time the customer gets home, the purchased digital assets can already be stored on device 191.

In some embodiments, fulfillment system 190 includes or has access to a customer information database 194 (see FIG. 1). Customer information database 194 may store information concerning customers who have an account with the owner/operator of store 101. For example, database 104 may store information related to a customer's listening and viewing habits.

For instance, in some embodiments, software 193 may be configured so that each time customer 111 listens to a song using device 101, software 193 transmits to fulfillment system an identifier identifying the customer and a song identifier identifying the song. Fulfillment system 190 may receive the information and store it in database 194. In this way, database 194 may store information that can be used to determine the music tastes of the customer.

This information can be used to target advertising to the customer. For example, when the customer goes to store 101 and inputs into an LVS 102 the identifier identifying the customer, the LVS can transmit the identifier to system 106, which relays it to fulfillment system 190. In response, fulfillment system 190 can use the identifier to find information in database 194 concerning the customer and can use this information to select digital assets to offer to the customer. That is, fulfillment system 190 can transmit a targeted advertising message to system 106, which can then relay the message to the LVS 102 that the customer is using. The LVS 102 can then display the targeted advertising message.

Referring back to FIG. 1, it should be appreciated that system 106 may be implemented using one or more conventional computer systems, which computer systems may or may not be co-located, together with software designed to execute the functionality provided by system 106 described herein. Similarly, fulfillment system 190 may be implemented using one or more conventional computer systems, which computer systems may or may not be co-located, together with software designed to execute the functionality provided by system 190 described herein. Also, although databases 107 and 109 are shown as being separate and distinct, it is contemplated the information contained in databases 107 and 109 may be stored in single database or multiple databases. Further, although only a single store 101 is shown as being in communication with fulfillment system, it is contemplated that multiple stores will have a set-up like store 101 (i.e., multiple stores will have a server system 106 and several LVSs 102).

Figure 11:
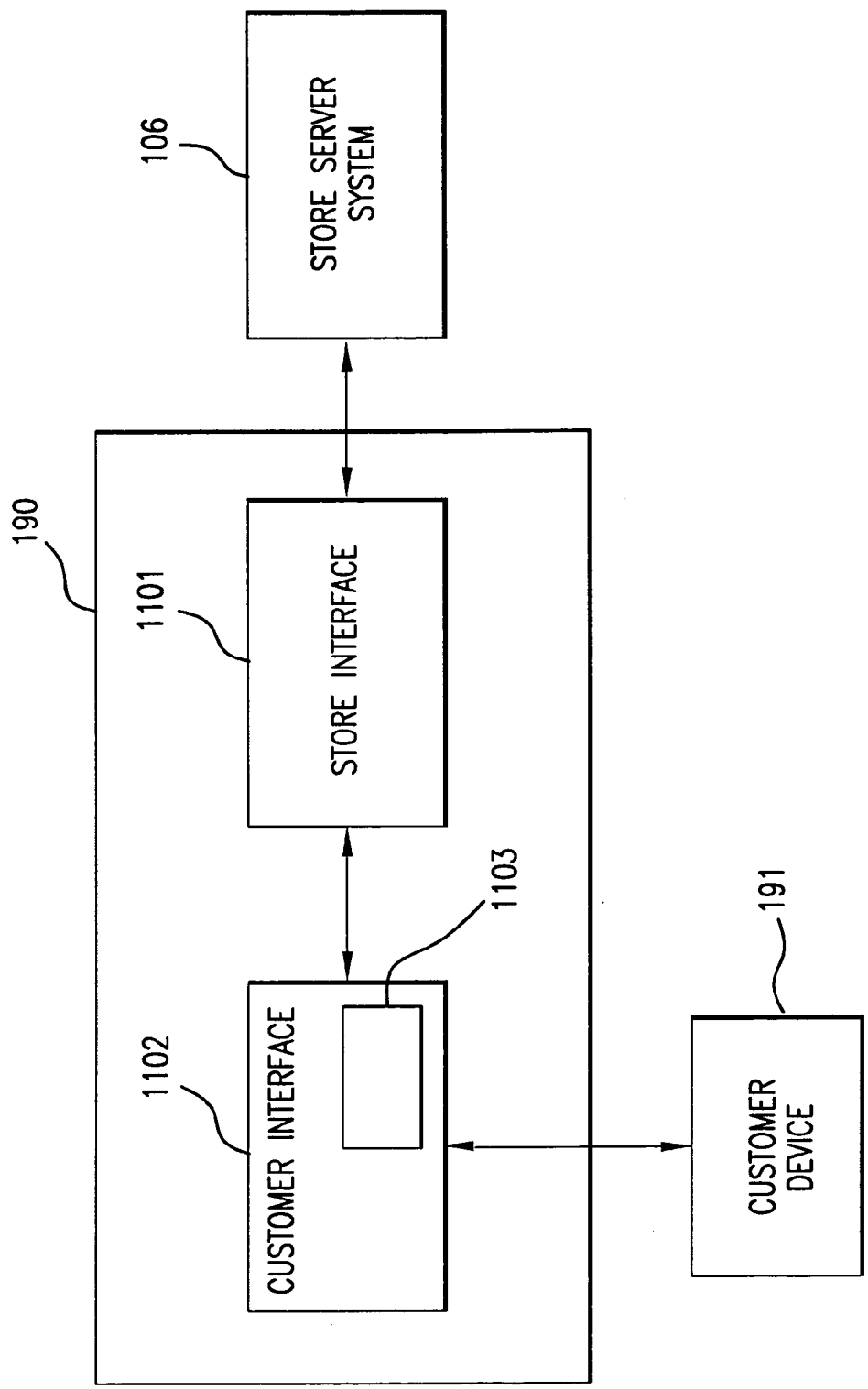
FIG. 11 is a block diagram illustrating a fulfillment system according to an embodiment of the invention.

Referring now to FIG. 11, FIG. 11 is a block diagram further illustrating fulfillment system 190 according to an embodiment of the invention. As shown in FIG. 11, fulfillment system 190 may include a store interface server 1101 and a customer interface server 1102, which may include an HTTP server 1103. Store interface server 1101 may be owned and operated by the entity that owns/operates store 101, whereas server 1102 may be owned/operated by a third-party vendor. As further shown in FIG. 11, store interface server is coupled between server system 106 and customer interface server 1102, and customer device 191 communicates directly with customer interface server 1102.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added and other steps omitted, and the order of the steps may be re-arranged.

What is claimed is:

1. A method for enabling a customer in a retail store to purchase digital assets, comprising:

receiving at a terminal located within the retail store a virtual shopping cart identifier inputted by the customer;

transmitting the identifier from the terminal to a server system, which determines the status of the identified virtual cart;

after determining the status of the cart, transmitting a response to the terminal;

displaying to the customer at the terminal a user interface that enables the customer to select a digital asset for purchase;

receiving at the terminal input from the customer indicating that the customer desires to add the digital asset to the customer's virtual cart;

transmitting from the terminal to the server system an asset identifier identifying the digital asset, wherein the server system associates the asset identifier with the cart identifier;

receiving at the terminal and from the customer an indication that the customer is ready to purchase the contents of the customer's virtual cart;

transmitting to a fulfillment system an order message, wherein the order message includes information identifying one or more digital assets, each of which digital asset has an identifier associated with the cart identifier;

receiving an order response from the fulfillment system, wherein the order response includes an order confirmation code;

providing the order confirmation code to the customer;

receiving a message transmitted from a device operated by the customer and located outside the store, wherein the message contains the order confirmation code; and after receiving the message, transmitting to the device located outside of the store the one or more digital assets.

2. The method of claim 1, further comprising:

receiving at a checkout terminal the virtual cart identifier;

transmitting from the checkout terminal to the server system the received cart identifier;

receiving from the server system purchase amount information;

receiving payment from the customer; and providing a receipt to the customer.

3. The method of claim 2, wherein the order confirmation code is printed on or stored in the receipt.

4. The method of claim 1, wherein the transmitting step further comprises:

fetching from the storage device digital assets identified by digital asset identifiers associated with the confirmation code; and transmitting the fetched digital assets from the fulfillment system to the device located outside of the store.

5. The method of claim 4, wherein the fulfillment system comprises a database that associates the confirmation code with one or more digital asset identifiers, each identifier identifying a digital asset.

6. The method of claim 1, wherein the user interface that enables the customer to select a digital asset for purchase also enables the user to select for the digital asset a purchase mode from a set of available purchase modes.

7. The method of claim 6, wherein the set of available purchase modes includes a copy to disk purchase mode and a digital download purchase mode.

8. The method of claim 7, further comprising determining the digital assets associated with the cart identifier that have been selected for digital download by the customer, wherein this determining step occurs prior to transmitting the order message to the fulfillment system, and all of the digital assets identified in the order message have been selected for digital download by the customer.

9. The method of claim 1, further comprising:

prior to receiving at the terminal located within the retail store the virtual shopping cart identifier inputted by the customer, making available to the customer a shopping card, wherein the virtual shopping cart identifier is printed on the shopping card and/or stored in the shopping card and the virtual shopping cart identifier identifies a particular virtual shopping cart;

receiving, at the server system, the asset identifier that was transmitted by the terminal; and in response to receiving the asset identifier, adding the identified asset to the particular virtual shopping cart identified by the virtual shopping cart identifier, wherein the step of adding the identified asset to the particular virtual shopping cart comprises updating a virtual cart database so that a record in the virtual cart database associates the asset identifier with the virtual cart identifier.

10. The method of claim 9, further comprising instructing the customer to go to a checkout counter with the shopping card after receiving at the terminal the indication that the customer is ready to purchase the contents of the customer's virtual cart and before providing the order confirmation code to the customer.

11. The method of claim 10, further comprising:

receiving the shopping card from the customer after or upon the arrival of the customer at the checkout counter; and inputting into a checkout terminal the virtual shopping cart identifier associated with the received shopping card.

12. The method of claim 1, wherein, at the time the terminal receives the virtual shopping cart identifier, the virtual shopping cart identifier is not anywhere associated with any information about the customer.

13. A method for enabling a customer in a retail store to purchase digital assets, comprising:

receiving at a terminal located within the retail store an account identifier associated with the customer;

transmitting the identifier from the terminal to a server system, which determines whether a database coupled to the server system associates any digital asset identifiers with the account identifier;

after determining whether the database associates any digital asset identifiers with the account identifier, transmitting a response to the terminal;

displaying to the customer at the terminal a user interface that enables the customer to select a digital asset for purchase;

receiving at the terminal input from the customer indicating that the customer desires to purchase the digital asset;

transmitting from the terminal to the server system an asset identifier identifying the digital asset, wherein the server system uses the database to associate the asset identifier with the account identifier;

receiving at the terminal an indication that the customer is ready to purchase the digital assets identified by the asset identifiers associated with the account identifier;

transmitting to a fulfillment system an order message, wherein the order message includes the account identifier and information identifying one or more digital assets, each of which digital asset has an identifier associated with the account identifier;

receiving from a device operated by the customer and located outside of the store the account identifier; and after receiving the account identifier, transmitting to the device located outside of the store the one or more digital assets.

14. The method of claim 13, wherein the transmitting step further comprises:

fetching from a storage device digital assets identified by digital asset identifiers associated with the account identifier; and transmitting the fetched digital assets from the fulfillment system to the device located outside of the store.

15. The method of claim 14, wherein the fulfillment system comprises a database that associates the account identifier with one or more digital asset identifiers, each identifier identifying a digital asset.

16. The method of claim 13, wherein the user interface that enables the customer to select a digital asset for purchase also enables the user to select a purchase mode for the digital asset from a set of available purchase modes.

17. The method of claim 16, wherein the set of available purchase modes includes a copy to disk purchase mode and a digital download purchase mode.

18. The method of claim 17, further comprising determining the digital assets associated with the account identifier that have been selected for digital download by the customer, wherein this determining step occurs prior to transmitting the order message to the fulfillment system, and all of the digital assets identified in the order message have been selected for digital download by the customer.

19. The method of claim 13, wherein the customer device includes software that is configured to automatically download the one or more digital assets from the fulfillment system so that the customer need not manually download the one or more digital assets.

20. A method for enabling a customer in a retail store to purchase digital assets, comprising:

providing the customer with a shopping card having a virtual shopping cart identifier printed thereon or stored therein;

placing a terminal in the retail store, the terminal having a reader for reading virtual shopping cart identifiers printed on or stored in shopping cards;

transmitting from the terminal to a server system the virtual shopping cart identifier after the reader reads the virtual shopping cart identifier, which server system determines whether a database coupled to the server system associates any digital asset identifiers with the cart identifier;

after determining whether the database associates any digital asset identifiers with the cart identifier, transmitting a response to the terminal;

displaying to the customer at the terminal a user interface that enables the customer to select a digital asset for purchase;

receiving at the terminal input from the customer indicating that the customer desires to purchase the digital asset;

transmitting from the terminal to the server system an asset identifier identifying the digital asset, wherein the server system associates the asset identifier with the cart identifier;

receiving at the terminal an indication that the customer is ready to purchase the digital assets identified by the asset identifiers associated with the cart identifier;

transmitting to a fulfillment system an order message, wherein the order message includes information identifying one or more digital assets, each of which digital asset has an identifier associated with the cart identifier;

receiving an order response from the fulfillment system;

providing an order confirmation code to the customer;

receiving from a device operated by the customer and located outside the store a message containing the order confirmation code; and after receiving the message containing the order confirmation code, transmitting to the device located outside of the store the one or more digital assets.

21. The method of claim 20, wherein the reader comprises at least one of a barcode scanner, magnetic strip reader, and an RFID reader.

22. The method of claim 20, further comprising:
receiving at a checkout terminal the virtual cart identifier;
transmitting from the checkout terminal to the server system the received cart identifier;
receiving from the server system purchase amount information;
receiving payment from the customer; and
providing a receipt to the customer.

23. The method of claim 22, wherein the order confirmation code is printed on or stored in the receipt.

24. The method of claim 20, wherein the transmitting step further comprises:
receiving by the fulfillment system the confirmation code from the device located outside of the store, wherein the fulfillment system comprises a storage device;
fetching from the storage device digital assets identified by digital asset identifiers associated with the confirmation code; and
transmitting the fetched digital assets from the fulfillment system to the device located outside of the store.

25. The method of claim 24, wherein the fulfillment system comprises a database that associates the confirmation code with one or more digital asset identifiers, each identifier identifying a digital asset.

26. The method of claim 20, further comprising instructing the customer to go to a checkout counter with the shopping card after receiving at the terminal the indication that the customer is ready to purchase the digital assets identified by the asset identifiers associated with the cart identifier and before providing the order confirmation code to the customer.

27. The method of claim 26, further comprising:
receiving the shopping card from the customer after or upon the arrival of the customer at the checkout counter; and
inputting into a checkout terminal the virtual shopping cart identifier associated with the received shopping card.

28. A method for enabling a customer in a retail store to purchase digital assets, comprising:
receiving at a terminal located within the retail store an account identifier associated with the customer or a virtual shopping cart identifier;
associating the account or cart identifier with a set of one or more audio encoding formats;
transmitting the account or cart identifier from the terminal to a server system;
transmitting an audio recordings identifier from the terminal to the server system, wherein the audio recordings identifier identifies a set of audio recordings;
determining the set of audio encoding formats associated with the account identifier or cart identifier;
determining whether an audio recording included in the set of audio recordings is available for purchase in at least one of the audio encoding formats in included in the set; and
displaying an indication to the customer that the audio recording is available for purchase only if it was determined that the audio recording is available for purchase in at least one of the audio encoding formats included in the set.

29. The method of claim 28, further comprising receiving a confirmation code from the fulfillment system prior to transmitting the audio recording to the device located outside of the store.

30. The method of claim 29, wherein the step of transmitting the audio recording includes the step of receiving at the fulfillment system the confirmation code from the device located outside of the store.

31. The method of claim 28, wherein the step of transmitting the audio recording includes the step of receiving at the fulfillment system the account identifier from the device located outside of the store.

32. The method of claim 28, wherein the audio recordings identifier identifies a set of one or more audio recordings released together on a compact disc or phonograph record.

33. The method of claim 28, wherein the audio recordings identifier identifies a set of one or more audio recordings recorded by the same artist.

34. The method of claim 28, wherein the device located outside of the store includes software that is configured to automatically download the audio recording from the fulfillment system so that the customer need not manually download the audio recording.

35. The method of claim 28, further comprising the steps of:
receiving at the terminal input from the customer indicating that the customer desires to add the audio recording to a virtual shopping cart;
transmitting from the terminal to the server system an asset identifier identifying the audio recording, wherein the server system uses the database to associate the asset identifier with the account or cart identifier;
receiving at the terminal an indication that the customer is ready to purchase the audio recording;
transmitting to a fulfillment system an order message, wherein the order message includes the asset identifier; and
transmitting the audio recording from the fulfillment system to a device operated by the customer and located outside of the store.

* * * * *

UNITED STATES PATENT AND TRADEMARK OFFICE
CERTIFICATE OF CORRECTION

PATENT NO. : 7,653,574 B2 Page 1 of 1
APPLICATION NO. : 11/025149
DATED : January 26, 2010
INVENTOR(S) : Harper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1337 days.

Signed and Sealed this

Twenty-third Day of November, 2010

David J. Kappos
*Director of the United States Patent and Trademark Office*